United States Patent

[11] 3,628,438

[72] Inventor Peter Loseries
 Diez, Germany
[21] Appl. No. 212
[22] Filed Jan. 2, 1970
[45] Patented Dec. 21, 1971
[73] Assignee Ernst Leitz GmbH
 Wetzlar, Germany
[32] Priorities Dec. 19, 1967
[33] Germany
[31] P 15 97 308.7;
 Jan. 31, 1969, Germany, No. P 19 04 751.9
 Continuation-in-part of application Ser. No. 782,173, Dec. 9, 1968, now abandoned.
 This application Jan. 2, 1970, Ser. No. 212

[54] SWINGING SECTOR CAMERA SHUTTER
 3 Claims, 7 Drawing Figs.
[52] U.S. Cl. .................................................. 95/55, 95/59
[51] Int. Cl. .................................................. G03b 9/10

[50] Field of Search ............................................ 95/55, 58, 59, 60

[56] References Cited
 UNITED STATES PATENTS
 3,269,293 8/1966 Kiper .............................. 95/60

Primary Examiner—Samuel S. Matthews
Assistant Examiner—Monroe H. Hayes
Attorney—Krafft & Wells ABSTRACT: A swinging-sector camera shutter comprising a plurality of sectors. Each sector comprises a plurality of blades including a primary blade and a plurality of covering blades. The primary blade of each sector executes a combined rotary-sliding movement while the covering blades execute a rotary movement about a common pivot point.

INVENTOR
PETER LOSERIES
BY
Krafft & Wells
ATTORNEYS

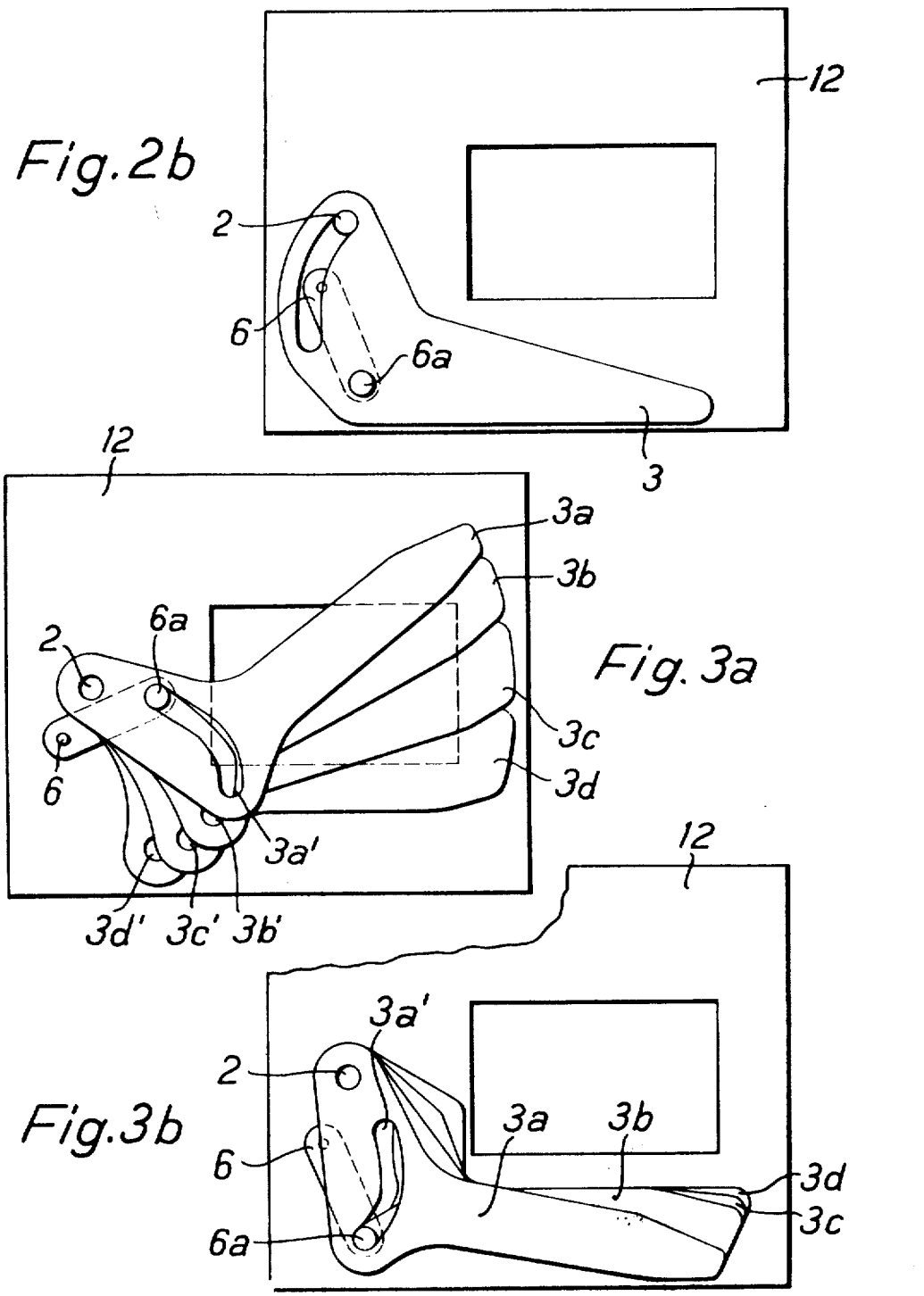

INVENTOR
PETER LOSERIES
BY Krafft & Wells
ATTORNEYS

3,628,438

SWINGING SECTOR CAMERA SHUTTER

CROSS-REFERENCE TO A RELATED APPLICATION

This application is a continuation-in-part of Ser. No. 782,173, filed Dec. 9, 1968.

BACKGROUND OF THE INVENTION

The field of the invention is pivoted blade shutters for photographic cameras. The invention is particularly concerned with swinging-sector shutters for photographic cameras wherein the swinging sectors are divided into a plurality of blades.

In swinging-sector shutters, each swinging sector is divided into individual blades which overlap one another in their end position outside the picture window, but which in their window-covering position at the other extremity of their movement are overlapped in telescopically fanned relationship. In contrast to shutters with rigid individual blades or with rigid and generally rotatable discs, these new shutters have the advantage of requiring much less space because in one of their end positions the individual blades will telescope into one another.

In the devices of the prior art, all of the blades of at least one sector have been mounted on a common axis. These blades have been actuated from their hubs to obtain maximum speed. This has resulted in a space problem because the outermost hub necessarily must have an especially large diameter. A further disadvantage is that the shutter-operating mechanism to actuate coaxial hubs is complex and expensive to manufacture.

Copending application Ser. No. 782,173, filed Dec. 9, 1968, of which this application is a continuation-in-part, describes a solution to the problems of the prior art by reducing the structural size and simplifying the type of drive of swinging sectional shutters by subdividing the sectional shutters into individual blades designed and arranged in such a manner that practical use of such shutters in miniature cameras is possible. This is accomplished by providing a plurality of pivot pins for the individual blades of each sector and a blade drive cooperating with a pin-slot coupling with the blades.

SUMMARY OF THE INVENTION

In accordance with the present invention, a further solution to the problems of drive complexity and space limitations is provided. In the present invention, the primary blade of each sector executes a combined rotary-sliding movement, the sliding movement taking place in the direction of the leading edge of the blade. The point of rotation of the primary blades is displaced far outside the baseplate of the shutter so that these blades must pivot through only a relatively small angle in order to sweep the image aperture with the leading edge. This permits a reduction in the necessary size of the baseplate resulting in a considerable saving in space. The covering blades accordingly must execute only a stepwise smaller pure rotary motion, thus requiring less space.

In accordance with a preferred embodiment of the present invention, the drive of each swinging sector is effected by a single operating crank which cooperates with the primary blade in the manner of an oscillating crank guide and with the covering blades in the manner of a simple crank guide. A common pin serves as a guide pin for the primary blades in their respective guide slots and as a pivot pin for the covering blades of both sectors. This common pin serves as a guide pin for the primary blades in their respective guide slots and a a pivot pin for the covering blades of both sectors. This common pin can be positioned in the extension of the centerline of the image aperture resulting in an absolutely symmetrical construction of the two sectors and the paths traversed thereby. A further advantage of this construction resides in that the counterweights used for balancing the mechanism may be attached in a simple manner to the cranks driving the blades.

BRIEF DESCRIPTION OF THE DRAWINGS

FIG. 2b is a plan view of the primary blade of the swinging sector of FIG. 2a in the opposed terminal position;

FIG. 3a is a plan view of the covering blades of a swinging sector in a first terminal position;

FIG. 3b is a plan view of the covering blades of the swinging sector of FIG. 3a in the opposed terminal position;

DESCRIPTION OF THE INVENTION

Figure 1:
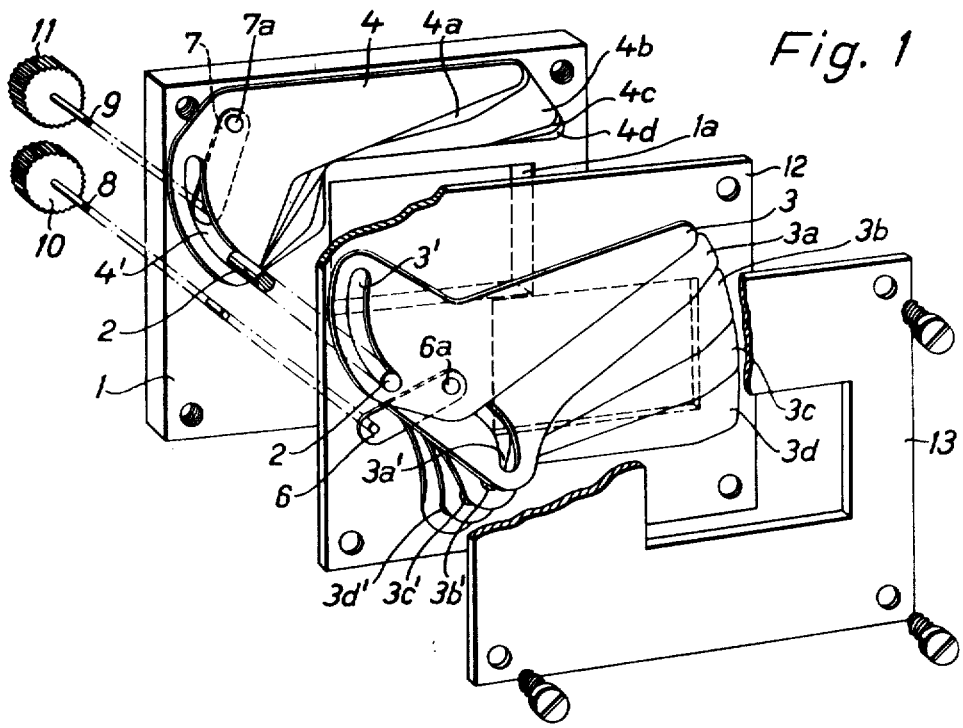
FIG. 1 is a view in perspective and partly in section of a shutter according to the present invention.

FIG. 1, 1 denotes the baseplate of the shutter containing the image aperture 1a proper. The plate carries a pivot pin 2 engaging all blades of the shutter.

The shutter is equipped with two swinging sectors, each of which is subdivided into a primary blade 3 and 4, respectively, and into four covering blades 3a, 3b, 3c, 3d, and 4a, 4b, 4c, 4d, respectively. Each of the blades is provided with a curved guide slot 3', 3a', 3b', 3c', 3d', and 4', 4a', 4b'c, 4c', 4d', respectively; these slots are, however, differently positioned and produce different effects in the operation of the primary blade and the covering blades of each swinging sector, as will be explained below.

Each sector is operated by means of a crank 6, 7 carrying pins 6a, 7a at the free ends thereof. The cranks are, in turn, driven by shafts 8, 9 via gear wheels 10, 11, each gearwheel, shaft, and crank being rigidly connected with one another in each instance.

A separating plate 12 is furthermore provided between the two sectors, so that the blades of one sector do not bind, or mesh with, the blades of the other sector during operation. The entire shutter is covered by a cover plate 13.

Figure 2A:
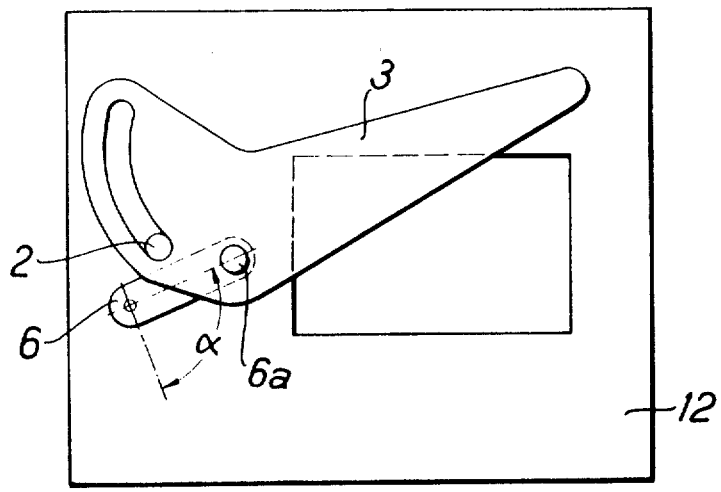
FIG. 2a is a plan view of the primary blade of a swinging sector in a first terminal position.

The mode of operation of the sector can best be seen from FIGS. 2a, 2b and 3a, 3b. FIGS. 2a and 2b, for reasons of presenting as clear an illustration as possible, shown only the primary blade 3 of one sector. The same blade of the other sector is to be pictured symmetrically thereto, as can be seen from FIG. 1.

In FIG. 2a, blade 3 is in a position wherein it covers a portion of the image aperture 1a, whereas, in FIG. 2b, this blade is in a position wherein it reveals the image aperture 1a. The intermediate plate, the pin 2, the blade 3 with its guide slot 3', and the crank 6 together form an oscillating crank guide. During the progression of this oscillating motion about the angle of rotation $\alpha$ the primary blade 3 executes a motion composed of rotation and sliding. The component of sliding motion is responsible for the fact that the space requirement of the shutter is considerably less than in the conventional shutters of the same construction.

There is thus no fixed pivot point for the primary blades 3 and 4. The pin 2 serves merely as a guide pin for these blades. The same pin 2 serves as a fixed pivot for all other blades. This can be seen from FIGS. 3a, 3b, wherein, analogously to FIG. 2a, FIG. 3a shows the covering blades 3a, 3b, 3c, 3d in a position in which they cover the image aperture. FIG. 3b shows the opposed position wherein the blades reveal the image aperture. Since the blades have a fixed pivot point in pivot pin 2, they form a simple crank guide with their guide slots 3a', 3b', 3c', 3d', together with the crank 6 and the intermediate plate 12 which, in this case, also serves as a support. As mentioned above, the space requirement of the covering blades due to the fact that the path to be traversed by them is shorter, is considerably less than that of the primary blades 3 and 4, so that the covering blades can be mounted on a stationary pin, without any disadvantages regarding space requirements.

Figure 4:
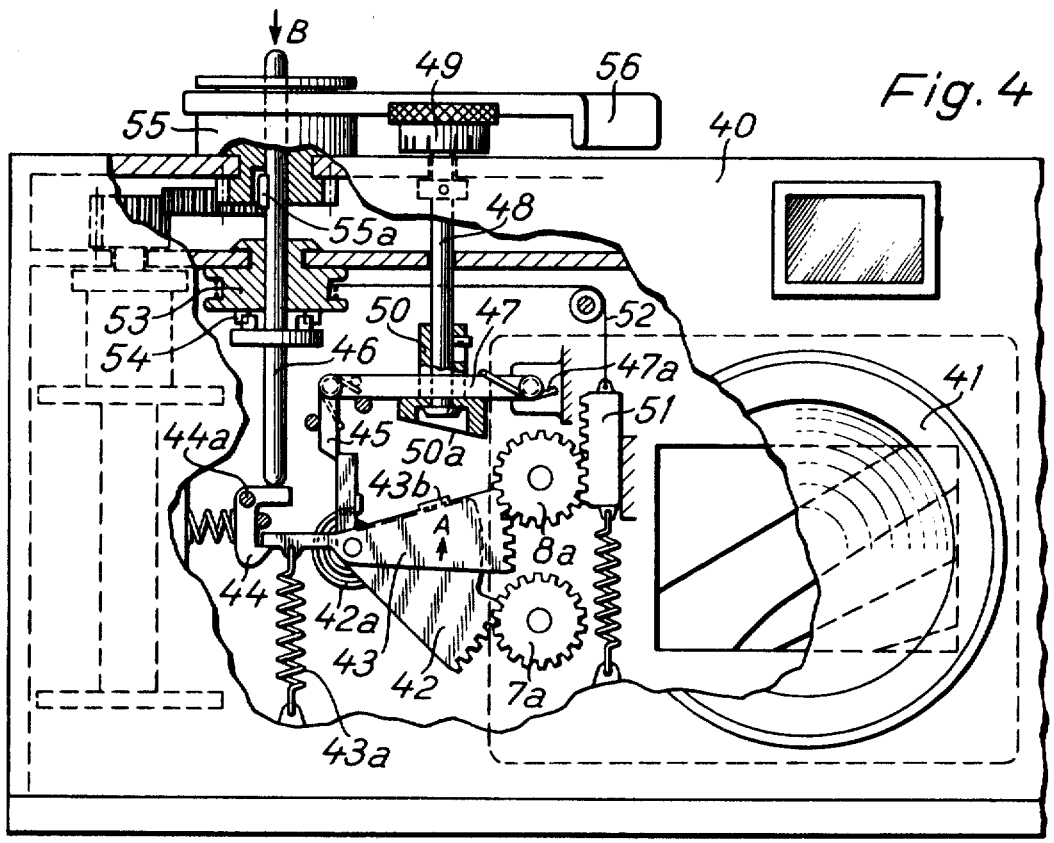
FIG. 4 shows a front view of a photographic camera wherein a swinging-sector shutter according to the present invention is incorporated.
Figure 5:
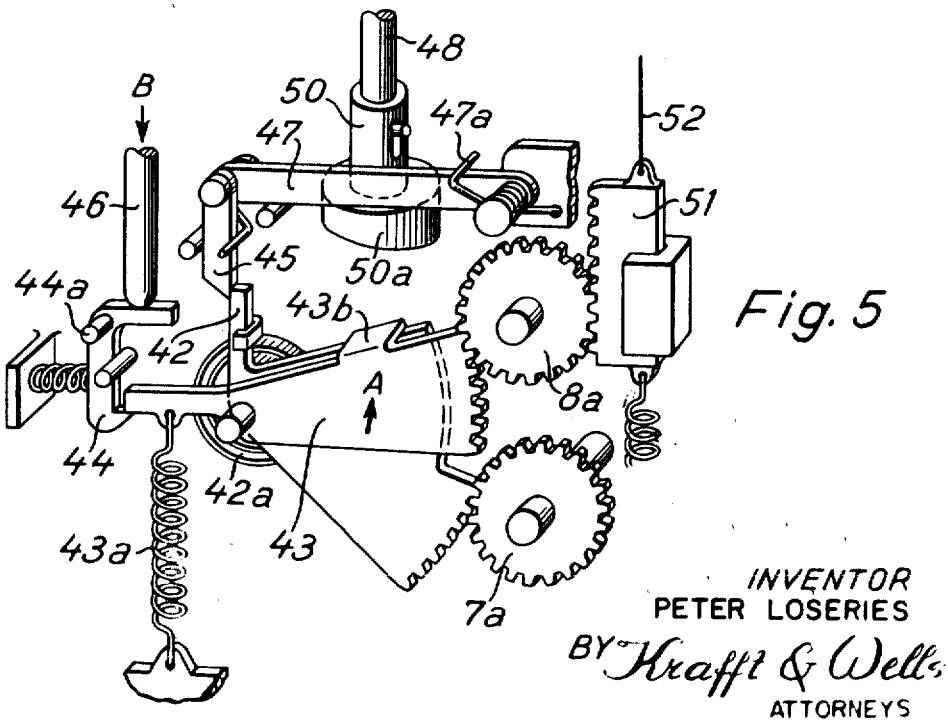
FIG. 5 shows a detailed perspective view of the shutter-drive mechanism.

In FIG. 4 the above-described shutter is incorporated in a camera housing 40 together with a shutter drive and a shutter-tensioning mechanism. The camera housing carries an objective 41 behind which the shutter is mounted inside the housing. The spur gears 7a, 8a are in mesh with two toothed sectors 42, 43 respectively. Two springs 42a, 43a on the sectors, urging them to rotate in the direction of arrow A. The FIGS. 4 and 5 shown the shutter in the tensioned position wherein the sectors 42, 43 are prevented from moving in the indicated direction by two locking levers 44, 45.

Locking lever 44 is a two-armed lever which is pivotable about a stationary pin 44a. One lever arm is in abutting contact with a shutter release bar 46, while the second lever arm retains sector 43 from being rotated by spring 43a.

Locking lever 45 is one-armed lever pivotably mounted at the end of another one-armed lever 47 which is swingable about a stationary pin 47a.

Further, there is a time-setting mechanism provided in the camera which mechanism consists mainly of a turnable shaft 48 journaled in the upper wall of the camera housing. Outside of the housing a setting knob 49 is positively secured to shaft 48, which knob carries a scale for the purpose of setting the desired shutter time. At the other end of shaft 48 there is a cartridge 50 mounted slidably by means of a pin-and-slot connection. Cartridge 50 has two different diameters, thus forming a shoulder whereon lever 47 rests with its lower edge, and the lower end of cartridge 50 is formed into an axial cam 50a against which sector 43 abuts when the latter swings upward after shutter release.

The above-described elements function as follows:

The shutter is released by pressing the release bar 46 in the direction of arrow B. This causes locking lever 44 to be pivoted in a clockwise direction thereby releasing sector 43. Consequently, sector 43 rotates in a counterclockwise direction under the influence of the force of spring 43a thereby rotating spur gear 8a in a clockwise direction which results in opening the shutter as described hereinbefore.

At the end of its rotation sector 43 abuts against cam 50a which is displaced upwards along shaft 48. Thereby the lever 47 is also swung upwards which causes locking lever 45 to release sector 42. Sector 42 now also swings upward thereby rotating spur gear 7a, as a consequence whereof the shutter is closed.

By turning shaft 48 it is possible to vary the exact moment at which sector 43 comes into contact with cam 50a. This causes the cartridge 50 and lever 47 to be lifted at different moments, sooner or later, relative to the beginning of the rotation of sector 43, i.e., the shutter is closed sooner or later after shutter opening.

Tensioning of the shutter after a previous shutter release is accomplished by a rack 51 which is in mesh with spur gear 8a. Rack 51 is operated by a cable 52 the other end of which is fastened to a reel 53, the latter being freely rotatable on an inner wall of the camera housing. The release bar 46 extends through a hole in reel 53 and is connected thereto by means of a releasable coupling 54. By means of a tongue-and-groove connection 55a the release bar 46 is also in driving engagement with a spur gear 55 which is solidly connected to the shutter-tensioning and film-advance lever 56.

In lever 56 is operated spur gear 55 rotates with it. Via the tongue-and-groove connection 55a it also causes the release bar 46 to rotate which, in turn, rotates reel 53. Thus, the cable 52 is wound on the reel 53 thereby moving rack 51 back into its upper position. Rack 51 drives spur gear 8a, and the latter rotates sector 43 which is thereby moved from its shutter-released position back to the shutter-tensioned position. A bent portion 43b engages sector 42 and also moves sector 42 back to the tensioned position.

During shutter release, the release bar 46 is pressed downwards so that the bar becomes disengaged from reel 53. As a consequence thereof, reel 53 can rotate freely so that rack 51 can move together with spur gear 8a.

What is claimed is:

1. A swinging-sector camera shutter having an image-aperture plate (1) and two swinging sectors (3,3a, 3b, 3c, 3d; 4, 4a, 4b, 4c, 4d) each said swinging sector including a primary blade (3, 4) and a plurality of covering blades (3a, 3b, 3c, 3d; 4a, 4b, 4c, 4d) and being adapted for movement to and fro across said aperture plate, and means (6a, 7a) cooperating with the primary blade of each said swinging sector to provide a combined rotary-sliding motion thereof in which the sliding component of motion extends substantially in the direction of the leading edge of the primary blade.

2. The swinging sector camera shutter of claim 1, including drive means (6, 7) for each swinging sector, each said drive means cooperating with the corresponding primary blade in the manner of an oscillating crank guide and with the corresponding covering blades in the manner of a simple crank guide, guide slots 3', 4') in said primary blades, an a pin (2) common to all said blades and serving as a guide for the slots in said primary blades and as a pivot for said covering blades.

3. The swinging-sector camera shutter of claim 2, in which said pin is located on an extension of the horizontal centerline of the image aperture.

* * * * *